(12) United States Patent
Blass et al.

(10) Patent No.: US 8,131,548 B2
(45) Date of Patent: Mar. 6, 2012

(54) DYNAMICALLY ADJUSTING SPEECH GRAMMAR WEIGHTS BASED ON USAGE

(75) Inventors: Oscar J. Blass, Boynton Beach, FL (US); Harvey M. Ruback, Loxahatchee, FL (US); Roberto Vila, Hollywood, FL (US)

(73) Assignee: Nuance Communications, Inc., Burlington, MA (US)

( * ) Notice: Subject to any disclaimer, the term of this patent is extended or adjusted under 35 U.S.C. 154(b) by 1277 days.

(21) Appl. No.: 11/369,092

(22) Filed: Mar. 6, 2006

(65) Prior Publication Data

US 2007/0208555 A1    Sep. 6, 2007

(51) Int. Cl.
  *G10L 15/18* (2006.01)
  *G10L 15/00* (2006.01)
  *G10L 11/00* (2006.01)
(52) U.S. Cl. .................. 704/257; 704/231; 704/270
(58) Field of Classification Search ........... 704/231–257
See application file for complete search history.

(56) References Cited

U.S. PATENT DOCUMENTS

| | | | |
|---|---|---|---|
| 6,076,061 A | 6/2000 | Kawasaki | |
| 6,173,266 B1 * | 1/2001 | Marx et al. ............... | 704/270 |
| 6,499,011 B1 | 12/2002 | Souvignier et al. | |
| 7,590,536 B2 * | 9/2009 | Bates et al. ............... | 704/244 |
| 2003/0004717 A1 * | 1/2003 | Strom et al. ............. | 704/240 |
| 2003/0037053 A1 | 2/2003 | Wang et al. | |
| 2005/0125234 A1 * | 6/2005 | Endo et al. ............... | 704/275 |
| 2005/0192802 A1 * | 9/2005 | Robinson et al. ......... | 704/240 |
| 2006/0287866 A1 * | 12/2006 | Cross et al. ............... | 704/275 |

* cited by examiner

*Primary Examiner* — Samuel G Neway
(74) *Attorney, Agent, or Firm* — Wolf, Greenfield & Sacks, P.C.

(57) ABSTRACT

A speech processing method can automatically and dynamically adjust speech grammar weights at runtime based upon usage data. Each of the speech grammar weights can be associated with an available speech command contained within a speech grammar to which the speech grammar weights apply. The usage data can indicate a relative frequency with which each of the available speech commands is utilized.

33 Claims, 3 Drawing Sheets

DYNAMICALLY ADJUSTING SPEECH GRAMMAR WEIGHTS BASED ON USAGE

BACKGROUND

1. Field of the Invention

The present invention relates to the field of speech processing, and, more particularly, to dynamically adjusting speech grammar weights based on usage statistics.

2. Description of the Related Art

A speech recognition grammar defines valid words or phrases that are to be speech recognized. A speech recognition engine compares the words and phrases against an utterance and determines a probability that the utterance matches one or more of the words in the grammar. Speech recognition grammar weights can be associated with grammar words, where each weight represents a probability or likelihood that an associated word will be spoken. A grammar word having a greater relative weight than other grammar words is more likely to be matched to an utterance.

Grammar weights can be effectively used to tactically increasing speech recognition accuracy. That is, weights allow for performance improvements without degrading overall speech recognition accuracy outside a context of a particular application or grammar.

Additionally, the use of grammar weights is a relatively light-weight technique that does not add significant computational overhead to a speech recognition system. Accordingly, grammar weights can be an effective technique to customize performance of a speech recognition system. This is especially true for embedded speech recognition systems that can have severe resource constraints, such as speech recognition systems often found in mobile phones or other consumer electronic devices.

Conventional techniques for applying grammar weights are primarily static processes optimized for a theoretical average user. In other words, grammar weights are adjusted so that an estimated most utilized grammar word will have a higher weight than a lesser utilized word. These optimizations for an average user, however, do not fit the usage patterns for all users, but instead represent a compromise established for a generic user.

No known conventional technology automatically and dynamically adjust grammar weights based upon actual usage of a speech recognition system by a user or set of users. These usages can be significantly different from the theoretical usage estimates for which factory established grammar weights are optimized. In conventional systems, speech recognition accuracy increasingly degrades as the actual usages of a speech-enabled system diverge from the theoretical usage estimates.

SUMMARY OF THE INVENTION

The present invention automatically records usage data for a speech-enabled device or system and dynamically adjusts grammar weights of speech grammars used by the device or system in accordance with the usage data. As one word in a grammar is utilized more often than another word, the more often utilized word is automatically given a greater relative grammar weight. By dynamically modifying grammar weights, the invention guarantees an increased recognition accuracy over time. Using the present invention, all the normal advantages associated with grammar weights are maintained, while risks associated with poor grammar weight selections are avoided.

The present invention can be implemented in accordance with numerous aspects consistent with material presented herein. For example, one aspect of the present invention can include a speech processing method that automatically and dynamically adjusts speech grammar weights at runtime based upon usage data. Each of the speech grammar weights can be associated with an available speech command contained within a speech grammar to which the speech grammar weights apply. The usage data can indicate a relative frequency with which each of the available speech commands is utilized.

Another aspect of the present invention can include a software method for performing speech recognition. The method can identify a user. A set of user-specific speech grammar weights can be retrieved from a data store. The set of speech grammar weights can be automatically and dynamically adjusted at runtime based upon user-specific usage data. One or more user utterances can be speech recognized using a speech grammar containing at least one available speech commands. In the speech recognizing step, the retrieved speech grammar weights can be applied to the available speech commands.

Still another aspect of the present invention can include a speech recognition system. The system can include at least one speech grammar that includes one or more words or phrases that can be speech recognized by a speech recognition engine. The system can also include one or more sets of speech grammar weights. In each set of grammar weights, a weight can be associated with each word or phrase in the speech grammar. Each set of speech grammar weights can be associated with a corresponding set of usage statistics. Each usage statistic in a set can be associated with one of the speech grammar weights from the corresponding set of speech grammar weights. The system can further include programmatic instructions stored in a computer readable medium that automatically adjust speech grammar weights in accordance with associated ones of the usage statistics. In the system, the set of usage statistics can be dynamically updated as the speech recognition system is utilized. The set of speech grammar weights can be dynamically updated in a corresponding fashion.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
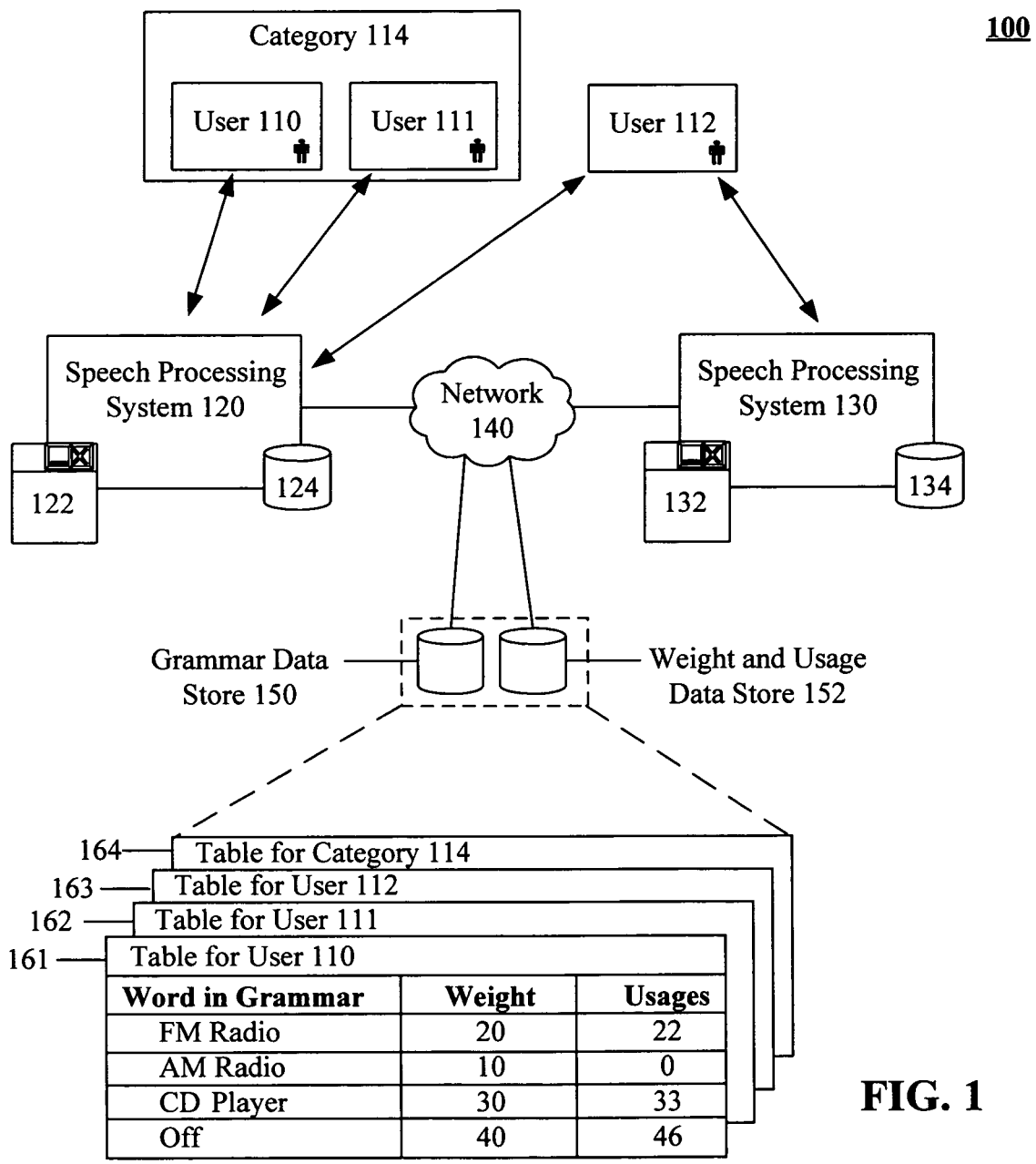
FIG. 1 is a schematic diagram of a system having dynamic usage-based grammar weights in accordance with an embodiment of the inventive arrangements disclosed herein.

FIG. 1 is a schematic diagram of a system 100 having dynamic usage-based grammar weights in accordance with an embodiment of the inventive arrangements disclosed herein. In system 100, one or more speech processing systems 120 and 130 can include a machine-readable program 122 or 132 that automatically speech recognizes utterances. Available words or phrases used by the program 122 and/or 132 can be included within one or more speech grammars. The speech grammars can be stored within a local data store 124 and/or 134. The speech grammars can also be stored in a network data store 150 accessible via network 140. The words and phrases in the speech grammars can be associated with probabilities or speech grammar weights.

The speech grammar weights can be automatically and dynamically adjusted based upon usage statistics. The program 122 and/or 132 can automatically record and/or capture the usage statistics as the associated speech processing system 120 and/or 130 is used. The usage statistics and speech grammar weights can be stored within a local data store 124 and/or 134 or can be stored in a remote data store 152.

In one arrangement, usage statistics and corresponding speech grammar weights can be user-specific and/or category-specific. Moreover, usage recordation behavior of system 120 or 130 can be user configurable for different modes, such as a user-specific usage mode, a category-specific mode, and a user independent mode. For example, when system 120 is configured for a user-specific usage mode, each of users 110, 111, and 112 can have an associated set of usage grammar weights and usage statistics. Thus, each word in a speech recognition grammar used by system 120 can be associated with a different probability depending on whether user 110, 111, or 112 is utilizing system 120.

System 120 can determine user 110-112 identity in any of a variety of ways. For example, system 120 can require a user to log onto a speech processing system 120 using a unique identifier. System 120 can also automatically determine a user's identity using biometrics, such as voice print analysis or finger print identification.

In another arrangement, one or more users 110-111 can be grouped into a category 114 of users having similar usage habits. Usage statistics and grammar weights can apply to the category 114, instead of to individual users 110-111 in the category.

For example, speech processing system 120 can include a speech-enabled remote control for an entertainment system. Different categories 114 can be established for different types of household members, each having different television viewing habits and/or music tastes. For instance, different categories 114 reflecting different television viewing habits can be established for young children, for teenagers, and for adults. The different categories 114 can have different associated parental controls as well as have different speech grammar weights. In another example, different categories 114 can be established for a speech-enabled music jukebox 120, where categories 114 can include "jazz listeners," "country listeners," "alternative music listeners," and the like.

It should be appreciated that usage statistics, grammar weights, and grammars can be stored in a common data store 124, 134, 150, and/or 152 or in different data stores 124, 134, 150, and/or 152 depending upon implementation choices for a given speech processing system 120 and 130. Further, multiple speech processing systems 120 and 130 can utilize the same speech grammars, speech grammar weights, and/or usage statistics.

For example, usage statistics for user 112 can be automatically recorded and applied to speech grammar weights corresponding to a speech grammar used by both system 120 and 130. Accordingly, if system 120 and system 120 are both compatible speech-enabled telephone systems used by user 112, the usage statistics for both systems 120 and 130 can be combined into a common usage recordation data store. This data store can be a single network accessible data store or can comprise multiple physical data stores that are periodically synchronized with each other. The grammar weights for each system 120 and 130 can be automatically adjusted in accordance with this common usage recordation data store. Accordingly, speech recognition behavior and accuracy as applied to user 112 can be standardized across more than one system 120 and 130.

Tables 161-164 illustrate that a common grammar can be associated with many different sets of grammar weights. Each set can be stored in a table 161-164 and can be associated with one or more users 110-112 or categories 114. For example, table 161 can be associated with user 110; table 162 with user 111; table 163 with user 112; and table 164 with category 114.

Turning to table 161, a grammar can include any number of words or phrases. For simplicity, table 161 shows a speech recognition grammar for stereo control having four entries, "FM radio," "AM Radio," "CD Player," and "off." Weights represent percentages, the sum of which can equal one hundred percent. Weights can approximately correspond to usage statistics. As usage statistics change, the associated weights can change in a corresponding fashion.

From the usages of table 161, it can be seen that user 110 uses the CD Player (33 usages) more often than the FM radio (22 usages), so that a grammar weight for the CD player (grammar weight of 30) is greater than a grammar weight for the FM radio (grammar weight of 20). If the usage pattern changes so that the user starts using the FM radio more frequently, the usage statistics and the grammar weights will be updated to reflect this increased FM radio usage.

Notably, a minimum weight can be established for each element in a speech grammar so that words and/or phrases will always be able to be recognized, even though they might not have been previously used. In this example, a minimum weight can be established at ten, so that even though AM Radio has no associated usages, it still possesses a grammar weight of ten.

While in one embodiment, usage statistics can be determined by speech command usages alone, other embodiments exist that update usages based upon additional criteria. For example, multimodal displays commonly permit a user to issue a command or active a function using either graphical user interface (GUI) input or speech input. Usage statistics can be updated regardless of an input modality used and the grammar weights can be adjusted accordingly. Additionally, because speech usage patterns can differ somewhat from GUI patterns, speech input usages can be weighed more heavily in the usage statistics than GUI input usages when the usages are combined into a total usage statistic.

Data stores 124, 134, 150, and 152 can each be a physical or virtual storage space configured to store digital information. Each of data stores 124, 134, 150, and 152 can be physically implemented within any type of hardware including, but not limited to, a magnetic disk, an optical disk, a semiconductor memory, a digitally encoded plastic memory, a holographic memory, or any other recording medium. Each of data stores 124, 134, 150, and 152 can be a stand-alone storage unit as well as a storage unit formed from a plurality of physical devices. Additionally, information can be stored within data stores 124, 134, 150, and 152 in a variety of manners. For example, information can be stored within a database structure or can be stored within one or more files of a file storage system, where each file may or may not be indexed for information searching purposes. Further, data stores 124, 134, 150, and 152 can utilize one or more encryption mechanisms to protect stored information from unauthorized access.

Network 140 can include any hardware/software/and firmware necessary to convey data encoded within carrier waves. Data can be contained within analog or digital signals and conveyed though data or voice channels. Network 140 can include local components and data pathways necessary for communications to be exchanged among computing device components and between integrated device components and peripheral devices. Network 140 can also include network equipment, such as routers, data lines, hubs, and intermediary servers which together form a data network, such as the Internet. Network 140 can also include circuit-based communication components and mobile communication components, such as telephony switches, modems, cellular communication towers, and the like. The network 140 can include line based and/or wireless communication pathways.

Figure 2:
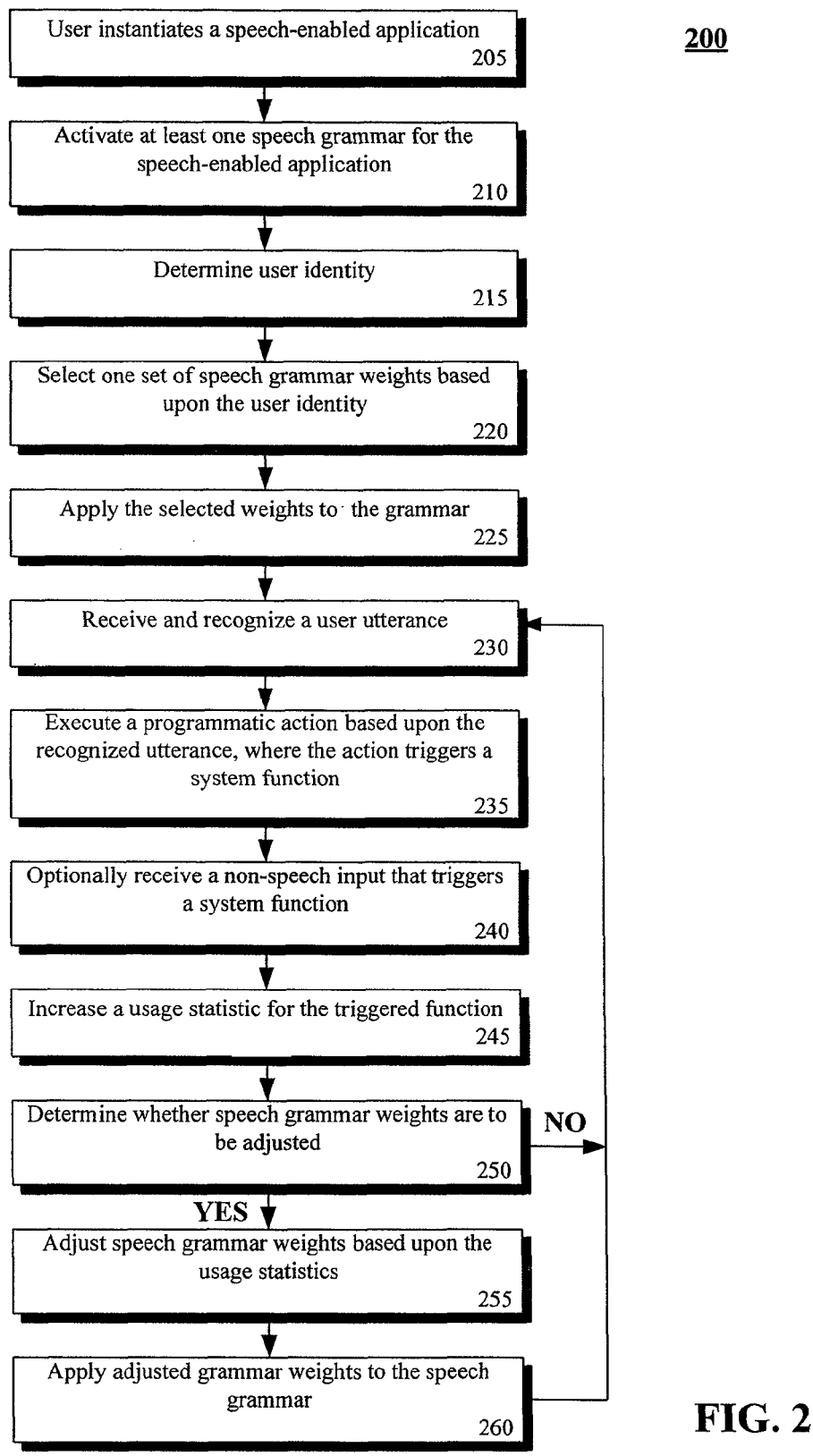
FIG. 2 is a flow chart of a method for dynamically adjusting speech grammar weights based upon usage in accordance with an embodiment of the inventive arrangements disclosed herein.

FIG. 2 is a flow chart of a method 200 for dynamically adjusting speech grammar weights based upon usage in accordance with an embodiment of the inventive arrangements disclosed herein. Method 200 can be performed in the context of a system 100.

Method 200 can begin in step 205 where a user can instantiate a speech-enabled application capable of speech recognizing user utterances. In step 210, at least one speech grammar can be activated for the speech-enabled application. A set of speech grammar weights can be applied to the speech grammar to establish a preference for particular speech responses contained within the speech-enabled grammar. Multiple sets of speech grammar weights can exist that are selectively applied to the speech grammar.

In step 215, for example, a user identity can be determined. In step 220, one of the multiple sets of speech grammar weights can be selected based upon the user identity. That is, one set of speech grammar weights can be associated specifically with the user.

In another example, a user can be one of many members belonging to a category. The selected set of speech grammar weights can be associated with the category.

In step 225, the selected speech grammar weights can be applied to the activated speech grammar. In step 230, the speech-enabled application can receive a user utterance. The user utterance can be speech recognized using the activated grammar. In step 235, the recognized utterance can optionally trigger a programmatic action. The programmatic action can activate a function of a system, such an activation can be considered a usage of that function. For example, a speech utterance of "increase volume" can increase a volume of a stereo system. In optional step 240, a different user selected action can cause the function to be used. For example, a user can rotate a volume dial to increase a volume of the stereo system.

In step 245, a usage statistic for the user triggered function can be increased. The usage statistic can be a user-specific usage statistic, when the speech grammar weights applied to the speech grammar are user-specific. The usage statistic can be a category-specific statistic when the speech grammar weights applied to the speech grammar are category-specific. In step 250, a determination can be made as to whether speech grammar weights should be adjusted based upon the usage statistics. These adjustments can occur every so many usages, after a designated time period, or based upon some other repeating criteria.

If the speech weights are not to be adjusted, the method can loop from step 250 to step 230, where another utterance can be received that is speech recognized using the grammar. If the speech weights are to be adjusted, the method can proceed from step 250 to step 255.

In step 255, the speech grammar weights can be adjusted based upon the usage statistics. For example, if a usage of one function more common than another, a speech grammar weight for a speech command associated with the more common function can have a greater weight than a speech command associated with a less frequently used function. In step 260, the adjusted grammar weights can be applied to the speech grammar. The method can loop from step 260 to step 230, where another utterance can be received that is speech recognized using the newly adjusted grammar.

Figure 3:
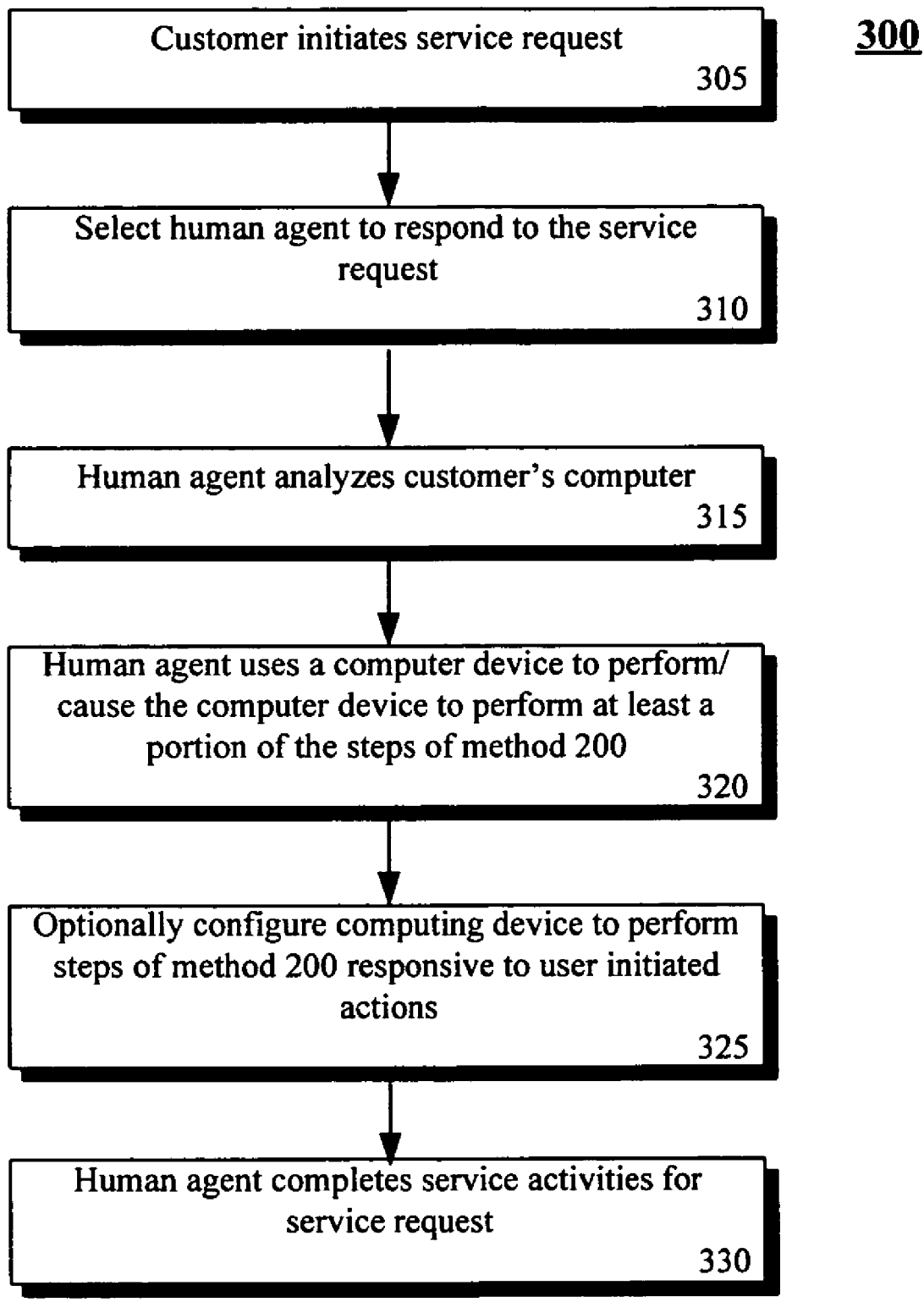
FIG. 3 is a flow chart of a method, where a service agent can configure a speech processing system that dynamically adjusts speech grammar weights based upon usage statistics in accordance with an embodiment of the inventive arrangements disclosed herein.

FIG. 3 is a flow chart of a method 300, where a service agent can configure a speech processing system that dynamically adjusts speech grammar weights based upon usage statistics in accordance with an embodiment of the inventive arrangements disclosed herein. Method 300 can be preformed in the context of system 100.

Method 300 can begin in step 305, when a customer initiates a service request. The service request can be a request for a service agent to convert a legacy system into a system that dynamically adjusts speech grammar weights based upon usage statistics. The service request can also be a request to troubleshoot a problem with a speech processing system having usage-based grammar weights.

In step 310, a human agent can be selected to respond to the service request. In step 315, the human agent can analyze a customer's current system and can develop a solution. The solution can include the acquisition and deployment of additional hardware and software.

In step 320, the human agent can use one or more computing devices to perform or to cause the computer device to perform the steps of method 200. In optional step 325, the human agent can configure the customer's computer in a manner that the customer or clients of the customer can perform one or more steps of method 200 in the future. For example, the service agent can load and configure software and hardware so that a customer's speech processing system will automatically adjust grammar weights based upon usage statistics. The usage statistics can dynamically change as the customer uses the system. In step 330, the human agent can complete the service activities.

It should be noted that while the human agent may physically travel to a location local to adjust the customer's computer or application server, physical travel may be unnecessary. For example, the human agent can use a remote agent to remotely manipulate the customer's speech processing system, grammar weights, and/or usage statistics.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method comprising acts of:
   accessing usage data indicative of usage of at least one system function in a system, wherein the system permits invocation of the at least one system function via at least one speech command and the system further permits invocation of the at least one system function via a non-speech input mechanism, and wherein the usage data reflects instances in which the at least one system function is invoked via the at least one speech command and instances in which the at least one system function is invoked via the non-speech input mechanism; and
   using at least one computer to dynamically adapt a speech grammar that comprises the at least one speech command for invoking the at least one system function in the system, wherein the at least one computer adapts the speech grammar based at least in part upon the usage data, and wherein, in adapting the speech grammar, the instances in which the at least one system function is invoked via the at least one speech command are weighted differently from the instances in which the at least one system function is invoked via the non-speech input mechanism.

2. The method of claim 1, wherein:
   the at least one speech command is a first speech command and the at least one system function is a first system function;
   the speech grammar further comprises one or more second speech commands for invoking, respectively, one or more second system functions; and
   the usage data based upon which the speech grammar is adapted is further indicative of usage of the one or more second system functions.

3. The method of claim 2, wherein the act of using the at least one computer to dynamically adapt a speech grammar comprises adjusting at least one speech grammar weight associated with the first speech command upward as the usage of the first system function increases relative to the usage of the one or more second system functions.

4. The method of claim 1, wherein the act of using the at least one computer to dynamically adapt a speech grammar comprises adjusting at least one speech grammar weight associated with the at least one speech command.

5. The method of claim 4, wherein the at least one speech grammar weight and the usage data are user-specific.

6. The method of claim 5, wherein the at least one speech grammar weight and the usage data are application specific.

7. The method of claim 6, wherein an application for which the at least one speech grammar weight and the usage data apply is associated with a plurality of different speech grammars, and wherein, for each of the plurality of different speech grammars, at least one associated speech grammar weight is automatically and dynamically adjusted.

8. The method of claim 5, wherein the speech grammar is a context dependent speech grammar.

9. The method of claim 5, wherein the speech grammar is utilized by a plurality of different users, and wherein each user of the plurality of different users is associated with a different set of user-specific speech grammar weights adjusted based upon usage data for that user.

10. The method of claim 5, wherein the speech grammar is associated with a first speech-enabled application, and wherein said method further comprises acts of:
    identifying a second system function of a second speech-enabled application as corresponding to the at least one system function;
    sharing, with the first speech-enabled application, usage data for the second system function in the second speech-enabled application; and
    responsive to the act of sharing, automatically and dynamically adjusting the at least one speech grammar weight.

11. The method of claim 5, further comprising an act of:
    conveying the usage data or the at least one speech grammar weight to a software developer having responsibilities for the speech grammar.

12. The method of claim 1, wherein the usage data comprises combined usage data generated based at least in part on the instances in which the at one system function is invoked via the at least one speech command and the instances in which the at one system function is invoked via the non-speech mechanism, and wherein, in the combined usage data, the instances in which the at least one system function is invoked via the at least one speech command are weighted more heavily than the instances in which the at least one system function is invoked via the non-speech input mechanism.

13. The method of claim 1, wherein the usage data is system specific and user independent.

14. The method of claim 1, wherein the speech grammar is utilized by a plurality of different users and wherein the method further comprises an act of:
    associating each of the plurality of users with a usage category of a plurality of usage categories, wherein each one of the plurality of usage categories is associated with a respective set of category-specific speech grammar weights adjusted based upon usage data for users in that one of the plurality of usage categories.

15. The method of claim 1, wherein the acts of claim 1 are performed by a service agent and a computing device manipulated by the service agent, the acts being performed in response to a service request.

16. A method comprising acts of:
    identifying a user;
    identifying a speech grammar comprising at least one speech command for invoking at least
    one system function in a system, wherein the system further permits invocation of the at least one system function via a non-speech input mechanism;

retrieving at least one speech grammar weight from a data store, wherein the at least one speech grammar weight is associated with the user;

using at least one computer to dynamically adjust the at least one speech grammar weight, based at least in part upon usage data indicative of usage of the at least one system function by the user, wherein the usage data reflects instances in which the at least one system function is invoked via the at least one speech command and instances in which the at least one system function is invoked via the non-speech input mechanism, and wherein, in adjusting the at least one speech grammar weight, the instances in which the at least one system function is invoked via the at least one speech command are weighted differently from the instances in which the at least one system function is invoked via the non-speech input mechanism; and speech recognizing a user utterance using the speech grammar, wherein the adjusted at least one speech grammar weight is applied to the at least one speech command.

17. The method of claim 16, wherein the user is a first user, the user utterance is a first user utterance, and the at least one speech grammar weight is a first speech grammar weight, and wherein the method further comprises acts of:

identifying a second user;

retrieving a second speech grammar weight from the data store, the second speech grammar weight being associated with the second user; and speech recognizing a second user utterance using the speech grammar, wherein the second speech grammar weight is applied to the at least one speech command.

18. The method of claim 16, wherein the acts of claim 16 are performed by a service agent and a computing device manipulated by the service agent, the acts being performed in response to a service request.

19. The method of claim 16, wherein the usage data is indicative of a frequency at which the at least one system function is invoked by the user.

20. At least one computer-readable recording medium having encoded thereon:

at least one speech grammar having a plurality of speech grammar elements, each speech grammar element comprising a word or a phrase;

at least one set of speech grammar weights, comprising at least one speech grammar weight associated with at least one of the plurality of speech grammar elements;

at least one set of usage statistics, comprising at least one usage statistic associated with the at least one speech grammar element of the plurality of speech grammar elements, the at least one speech grammar element being a speech command for invoking at least one system function in a system, wherein the system further permits invocation of the at least one system function via a non-speech input mechanism, and wherein the at least one usage statistic is indicative of usage of the at least one system function, the at least one usage statistic reflecting instances in which the at least one system function is invoked via the at least one speech command and instances in which the at least one system function is invoked via the non-speech input mechanism; and programmatic instructions that, when executed by at least one computer, automatically adjust the at least one speech grammar weight based at least in part on the at least one usage statistic, wherein the at least one usage statistic is dynamically updated as the speech recognition system is utilized, and wherein the at least one speech grammar weight is dynamically updated in a corresponding fashion, and wherein, in adjusting the at least one speech grammar weight, the instances in which the at least one system function is invoked via the at least one speech command are weighted differently from the instances in which the at least one system function is invoked via the non-speech input mechanism.

21. The at least one computer-readable recording medium of claim 20, wherein the at least one set of speech grammar weights comprise a plurality of sets of speech grammar weights, each set having a corresponding set of usage statistics, wherein each set of usage statistics is associated with a user or a category of users.

22. The at least one computer-readable recoding medium of claim 20, wherein the at least one usage statistic is indicative of a frequency at which the at least one system function is invoked.

23. An apparatus comprising at least one processor programmed to:

access usage data indicative of usage of at least one system function in a system, wherein the system permits invocation of the at least one system function via at least one speech command and the system further permits invocation of the at least one system function via a non-speech input mechanism, and wherein the usage data reflects instances in which the at least one system function is invoked via the at least one speech command and instances in which the at least one system function is invoked via the non-speech input mechanism; and dynamically adapt a speech grammar that comprises at least one speech command for invoking the at least one system function in the system, at least in part by adjusting at least one speech grammar weight associated with the at least one speech command based at least in part upon the usage data, and wherein, in adapting the speech grammar, the instances in which the at least one system function is invoked via the at least one speech command are weighted differently from the instances in which the at least one system function is invoked via the non-speech input mechanism.

24. The apparatus of claim 23, wherein:

the at least one speech command is a first speech command and the at least one system function is a first system function;

the speech grammar further comprises one or more second speech commands for invoking, respectively, one or more second system functions; and the usage data based upon which the at least one speech grammar weight is adjusted is further indicative of usage of the one or more second system functions.

25. The apparatus of claim 24, wherein the at least one speech grammar weight is adjusted upward as the usage of the first system function increases relative to the usage of the one or more second system functions.

26. The apparatus of claim 23, wherein the usage data comprises combined usage data generated based at least in part on the instances in which the at least one system function is invoked via the at least one speech command and the instances in which the at least one system function is invoked via the non-speech input mechanism, and wherein, in the combined usage data, the instances in which the at least one system function is invoked via the at least one speech command are weighted more heavily than the instances in which the at least one system function is invoked via the non-speech input mechanism.

27. The apparatus of claim 23, wherein the at least one speech grammar weight and the usage data are application specific.

28. The apparatus of claim 27, wherein an application for which the at least one speech grammar weight and the usage data apply is associated with a plurality of different speech grammars, and wherein, for each of the plurality of different speech grammars, at least one associated speech grammar weight is automatically and dynamically adjusted.

29. The apparatus of claim 23, wherein the speech grammar is utilized by a plurality of different users, and wherein each user of the plurality of different users is associated with a different set of user-specific speech grammar weights adjusted based upon usage data for that user.

30. The apparatus of claim 23, wherein the speech grammar is associated with a first speech-enabled application, and wherein the at least one processor is further programmed to:
   identify a second system function of a second speech-enabled application as corresponding to the at least one system function;
   share, with the first speech-enabled application, usage data for the second system function in the second speech-enabled application; and
   responsive to sharing the usage data, automatically and dynamically adjusting the at least one speech grammar weight.

31. The apparatus of claim 23, wherein the usage data is system specific and user independent.

32. The apparatus of claim 23, wherein the speech grammar is utilized by a plurality of different users, and wherein the at least one processor is further programmed to:
   associate each of the plurality of users with a usage category of a plurality of usage categories, wherein each one of the plurality of usage categories is associated with a respective set of category-specific speech grammar weights adjusted based upon usage data for users in that one of the plurality of usage categories.

33. The apparatus of claim 23, wherein the usage data is indicative of a frequency at which the at least one system function is invoked.

* * * * *